United States Patent
Yu

(10) Patent No.: US 10,314,409 B2
(45) Date of Patent: Jun. 11, 2019

(54) BABY CHAIR

(71) Applicant: Smart Brain Co., Ltd., Daegu (KR)

(72) Inventor: Byunghoon Yu, Daegu (KR)

(73) Assignee: Smart Brain Co., Ltd., Daegu (KR)

( * ) Notice: Subject to any disclaimer, the term of this patent is extended or adjusted under 35 U.S.C. 154(b) by 69 days.

(21) Appl. No.: 15/718,129

(22) Filed: Sep. 28, 2017

(65) Prior Publication Data

US 2018/0352969 A1 Dec. 13, 2018

(30) Foreign Application Priority Data

Jun. 7, 2017 (KR) ........................ 10-2017-0070701

(51) Int. Cl.
| | | |
|---|---|---|
| *A47D 1/00* | (2006.01) | |
| *A47D 15/00* | (2006.01) | |
| *B60R 21/00* | (2006.01) | |
| *B60N 2/28* | (2006.01) | |

(52) U.S. Cl.
CPC .............. *A47D 1/0085* (2017.05); *A47D 1/00* (2013.01); *A47D 1/008* (2013.01); *A47D 15/006* (2013.01); *A47D 15/005* (2013.01); *B60N 2/2839* (2013.01); *B60R 2021/0044* (2013.01)

(58) Field of Classification Search
CPC .......... B60N 2/2839; B60R 2021/0044; A47D 15/005; A47D 15/006
USPC .................................... 297/252, 256.15, 487
See application file for complete search history.

(56) References Cited

U.S. PATENT DOCUMENTS

| | | | | |
|---|---|---|---|---|
| 2,229,411 A | * | 1/1941 | Hughes | ................... A47D 13/08 108/28 |
| 2,330,538 A | * | 9/1943 | Allen | ................... A47D 15/006 24/129 B |
| 2,353,316 A | * | 7/1944 | Muller | ................. A47D 15/006 297/487 |

(Continued)

FOREIGN PATENT DOCUMENTS

| | | |
|---|---|---|
| JP | 2001-321280 A | 11/2001 |
| JP | 2014-50449 A | 3/2014 |

(Continued)

OTHER PUBLICATIONS

Online blog entry at www.naver.com, URL: http://blog.naver.com/hyehun15/220954844218.

*Primary Examiner* — Syed A Islam
(74) *Attorney, Agent, or Firm* — Novick, Kim & Lee, PLLC; Sang Ho Lee

(57) ABSTRACT

A baby chair includes a main body including a sitting groove having a shape corresponding to an outer surface of a backside of child sitting in the chair and an inner space in a lower end thereof, two front plates each including two insertion gadgets inserted into the inner space from an outer surface of each of a left and right lower end of the main body, two rear plates on an inner surface of the inner space each including two insertion holes into which the insertion gadgets are inserted, binding gadgets protruding toward an opposite direction of each pair of the insertion gadgets from a surface of each front plate, two belt plates each including a binding hole into which the pair of binding gadgets is inserted and rotatably attached thereto, and belt grooves which connect one side of the binding hole to an end of each belt.

6 Claims, 13 Drawing Sheets

(56) References Cited

U.S. PATENT DOCUMENTS

| | | | | | |
|---|---|---|---|---|---|
| 3,335,434 | A * | 8/1967 | Gamon | | A47C 20/028 297/153 |
| 4,280,731 | A * | 7/1981 | Pitts | | A61G 5/10 297/487 |
| 4,650,246 | A * | 3/1987 | Henriksson | | A47D 1/103 297/174 R |
| 4,854,638 | A * | 8/1989 | Marcus | | A47D 1/103 297/256.11 |
| 4,984,845 | A * | 1/1991 | Knoedler | | B60N 2/2839 297/256.15 |
| 5,052,750 | A * | 10/1991 | Takahashi | | B60N 2/2821 297/256.13 |
| 5,655,817 | A * | 8/1997 | Nienow | | B60N 2/2839 297/216.11 |
| 6,773,064 | B2 * | 8/2004 | Treen | | A47D 1/002 297/153 |
| 8,523,218 | B2 * | 9/2013 | Doucette | | B62B 7/14 280/47.4 |
| 9,028,006 | B2 * | 5/2015 | Yi | | A47D 1/00 297/487 |
| 9,603,464 | B2 * | 3/2017 | Sclare | | A47D 1/10 |
| 2012/0019034 | A1 * | 1/2012 | Young | | A47D 15/006 297/256.15 |
| 2015/0115677 | A1 * | 4/2015 | Pos | | B60N 2/2812 297/256.15 |
| 2016/0051063 | A1 * | 2/2016 | Cheng | | A47D 15/006 297/411.2 |
| 2018/0263379 | A1 * | 9/2018 | Cheng | | A47D 1/103 |

FOREIGN PATENT DOCUMENTS

| | | |
|---|---|---|
| KR | 20-0318423 Y1 | 6/2003 |
| KR | 10-2011-0057728 A | 6/2011 |
| KR | 20-2011-0011242 U | 12/2011 |
| KR | 20-2013-0006058 U | 10/2013 |
| KR | 10-1398417 B1 | 5/2014 |
| KR | 10-1503305 B1 | 3/2015 |

* cited by examiner

BABY CHAIR

CROSS-REFERENCE TO RELATED APPLICATION

This application claims the priority to Korean Patent Application No. 10-2017-0070701, filed on Jun. 7, 2017, in the Korean Intellectual Property Office, the disclosure of which is incorporated herein in its entirety by reference.

BACKGROUND

1. Field

The present disclosure relates to a baby chair that can be easily combined with a belt or a table.

2. Description of Related Art

An integral type baby chair 10 is formed in an integral shape by foam molding by pouring urethane in a mold. Accordingly, as illustrated in FIGS. 1 and 2, the integral type baby chair 10 includes a sitting groove 11 formed in a shape corresponding to an outer surface of the backside of a child sitting on the chair, a protrusion pillar 12 protruding upward between the child's legs, and an inner space 13 at an inner lower end of the baby chair 10. The baby chair 10 may also include a dining table 20, which includes an insertion surface 21 into which a protrusion pillar 12 is inserted and latching projections 22 at left and right ends. The dining table may be fixed to the baby chair 10 and be used by children approximately 3-6 years old.

Movements of a child sitting in the conventional baby chair 10 may be controlled by the attached table 20, however, due to the nature of the urethane material, the table 20 may easily fall off if the child is strongly lifted up from the baby chair 10. Therefore, it is difficult to control the movements of the child sitting in the baby chair 10 or fix the table 20 firmly to the baby chair 10.

The above-mentioned problems may be addressed by attaching belts on two sides of the baby chair 10 in order to control movements of the child sitting therein. However, as the baby chair 10 made from the above-mentioned material is soft and cushioned, when belt fixing units to fix the belts to the baby chair 10 are used, the belts may easily fall off the baby chair 10 and main walls of the baby chair on which the belt fixing units are attached may be easily torn off, thereby damaging the baby chair. Therefore, there have been no attempts to attach such belts or a table to conventional baby chairs by using this method.

The four documents indicated below have been identified as related art about "an integral type baby chair" on KIPRIS, a patent information network. The related art documents may be used to understand the background art of the technical field of the present disclosure and development of the same.

RELATED ART DOCUMENT

Patent Documents (Patent Document 0001) Patent No.: KR-10-2011-0057728
(Patent Document 0002) Registration Utility Model No.: KR-20-0318423
(Patent Document 0003) Public Utility Model No.: KR-20-2013-0006058
(Patent Document 0004) Registered Patent No.: KR-10-1503305

SUMMARY

In order to solve problems mentioned in the background art, the present disclosure is directed at facilitating installation of a belt and fixing of a table on a baby chair.

A baby chair according to an aspect of the present disclosure includes: a main body including a sitting groove which is formed in a shape corresponding to an outer surface of a child sitting in the chair and an inner space in a lower end; a pair of front plates, each including a pair of inserting gadgets inserted into the inner surface in a penetrating manner from an outer surface of each of a left lower end and a right lower end of the main body respectively; a pair of rear plates on an inner surface of the inner space of the main body, each including a pair of insertion holes with which the pair of insertion gadgets is engaged; binding gadgets, each protruding toward an opposite direction of each pair of the insertion gadgets from a surface of each of the front plates; and a pair of belt plates, each including a binding hole to which the pair of binding gadgets is inserted and rotatably attached and belt grooves which may connect one side of the binding hole with to an end of each of belts.

A baby chair according to another aspect of the present disclosure includes: a main body including a sitting groove which is formed in a shape corresponding to an outer surface of a child sitting in the chair and a protrusion pillar protruding upward between the child's legs; a table including an insertion surface into which the protrusion pillar is inserted; a latch protruded downward from an inner bottom of the insertion surface and provided with a latching groove on a lower end; an insertion path which is formed so that the latch may be inserted into the protrusion pillar; and a latching fixing module including a latching table including a latching jaw to which the latching groove of the latch inserted to the insertion path is engaged and fixed, a spring delivering an elastic force to the latching table to move the latching jaw in a direction engaging with the latching groove, and a button formed in the front of the latching table and used to release the latch by pushing the surface of the button in the front of the protrusion pillar.

According to configurations proposed by the present disclosure, belts and a table may be firmly fixed to a baby chair and conveniently used.

DETAILED DESCRIPTION OF THE EMBODIMENTS

Figure 1:
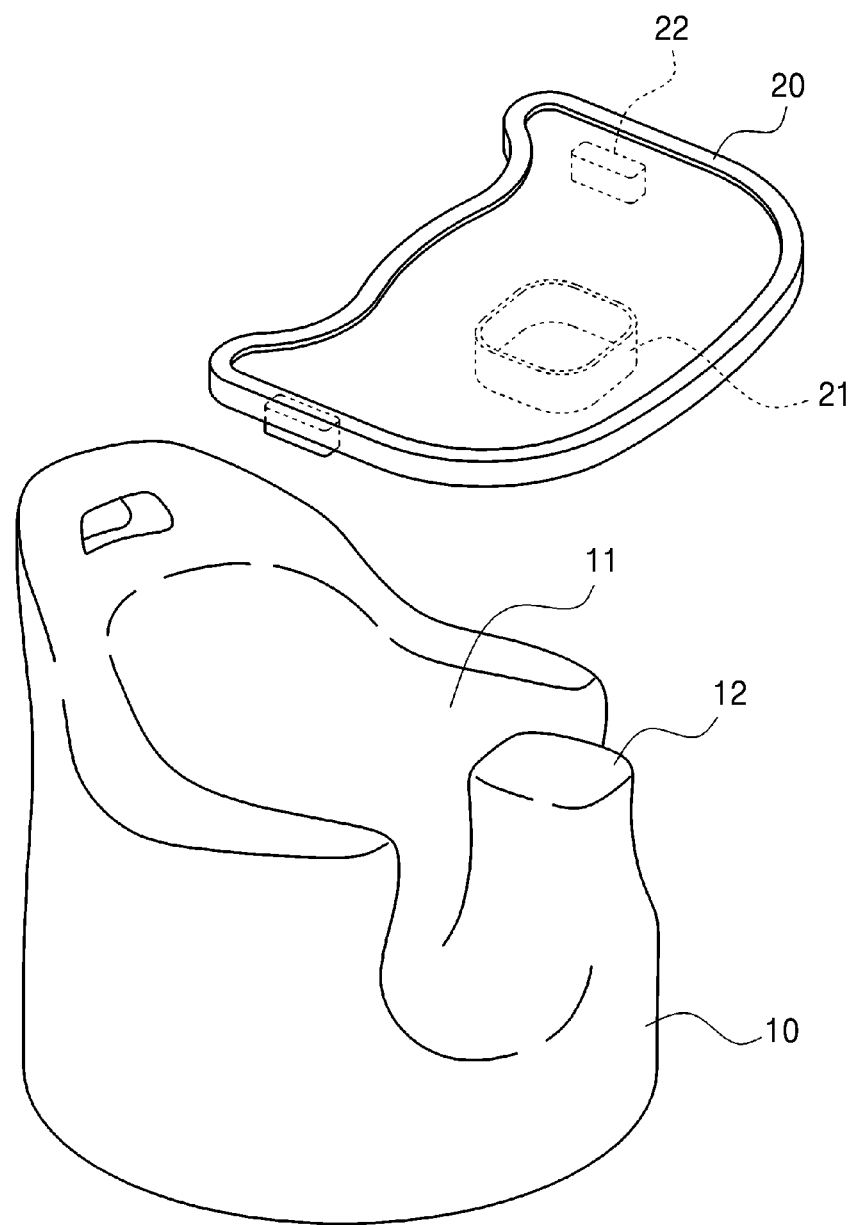
FIG. 1 is a perspective view of a conventional baby chair.
Figure 2:
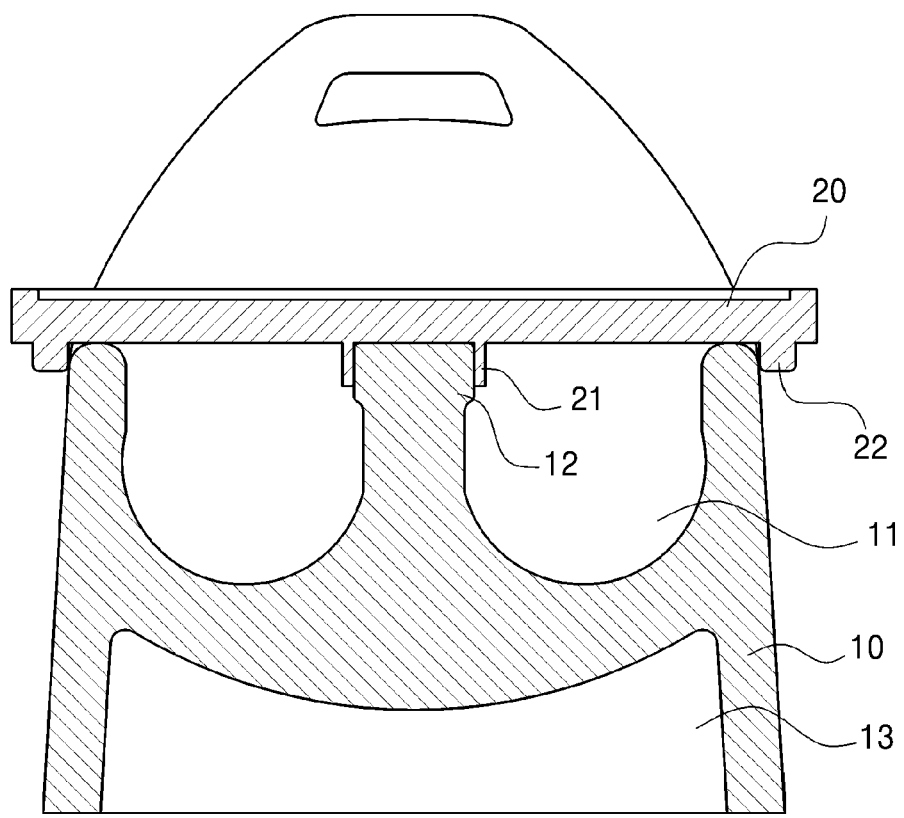
FIG. 2 is a combined cross-sectional view of FIG. 1 illustrating a combined state of the baby chair with a table.
Figure 3:
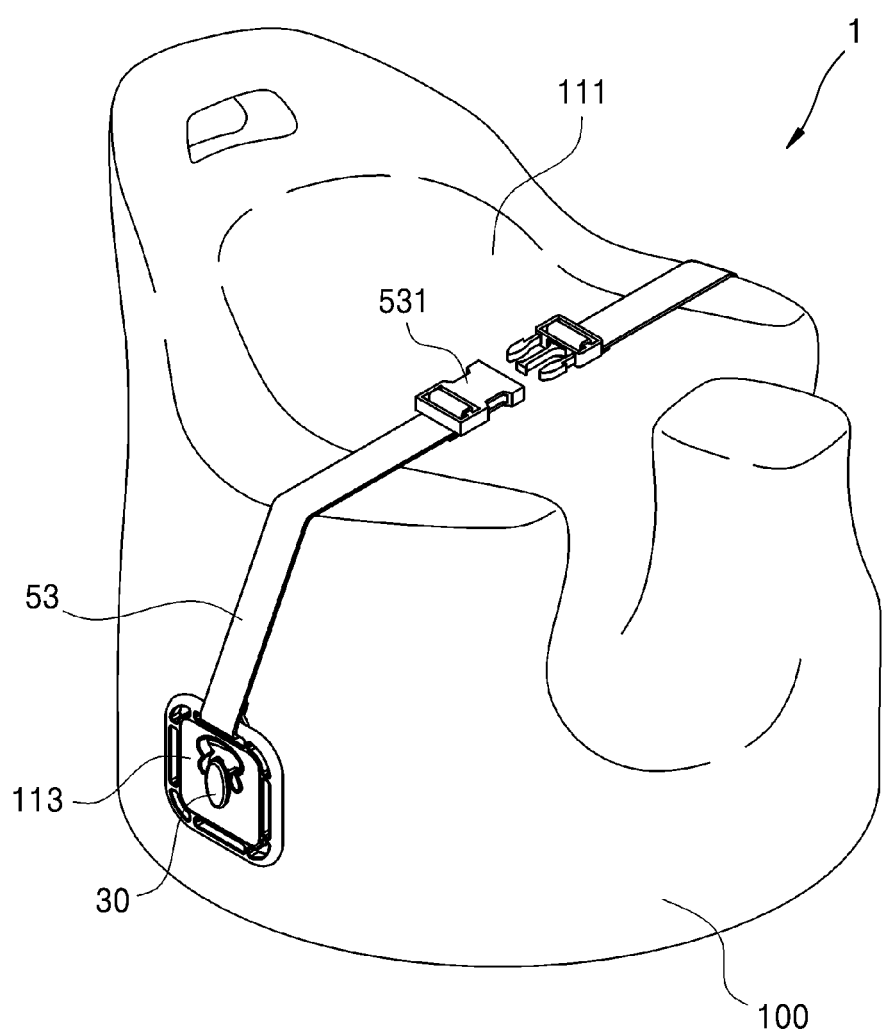
FIG. 3 is a perspective view illustrating a belt installation unit according to present disclosure.
Figure 4:
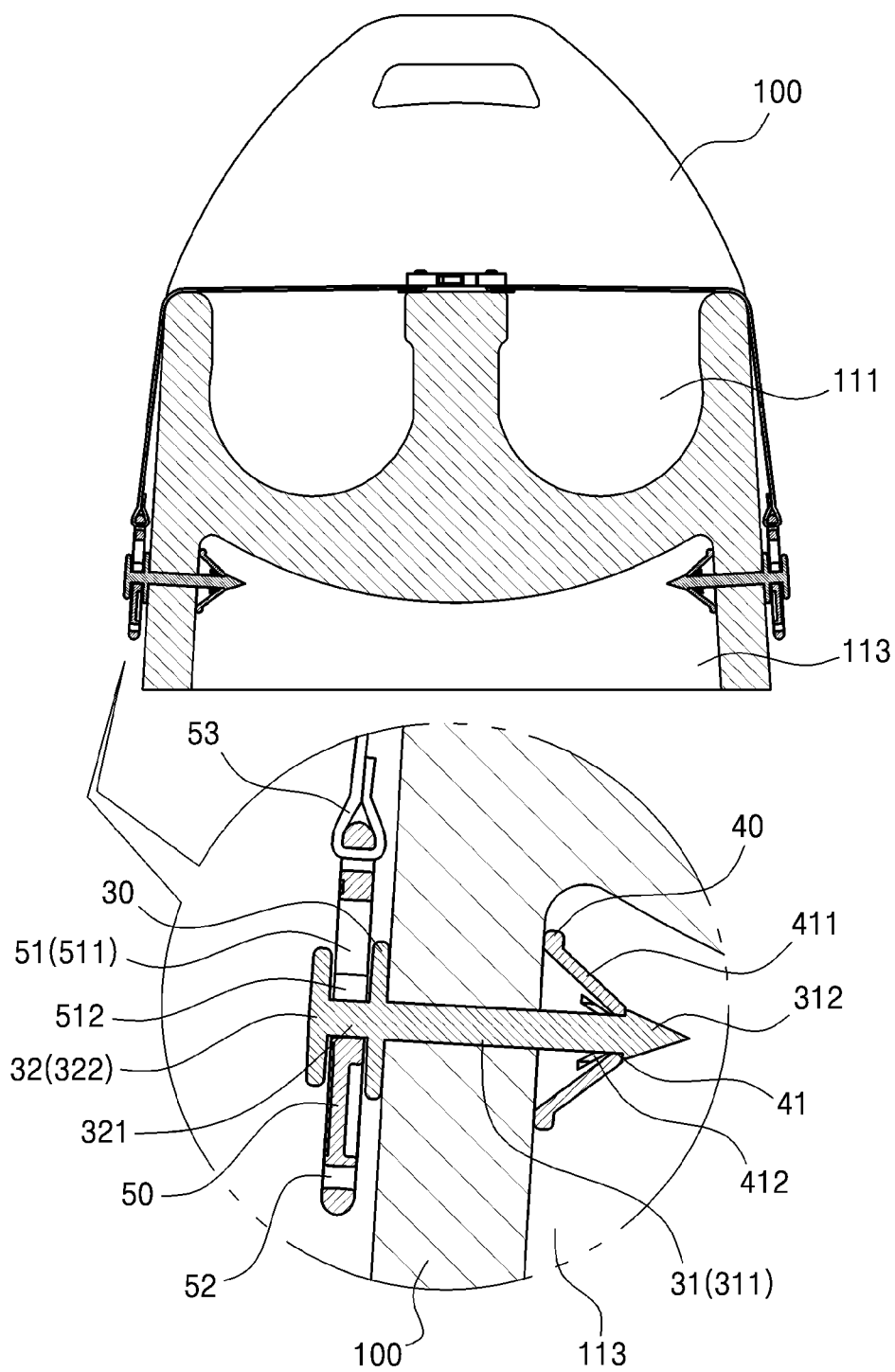
FIG. 4 is a cross-sectional view of FIG. 3.

Hereinafter, the present disclosure will be described in detail with reference to attached drawings. Although, the attached drawings may be exaggerated, omitted or illustrated briefly for convenience of explanation about chief parts, terms and names used in the description may be implicitly determined not by lexical meanings but by shapes, operations or roles of the configurations, and unless particularly mentioned, description about positions will be done according to the drawings. And detailed description about previously known and common technologies may blur points of the disclosure, therefore will be omitted or replaced by simple signs or names.

Hereinafter, an embodiment of a baby chair of the present disclosure will be described with reference to FIGS. 3 to 7.

A baby chair 1 includes a main body including a sitting groove 111 formed in shape corresponding to an outer surface of a backside a child sitting on a chair and an inner surface 113 at a lower end thereof. The main body 100 may be manufactured in an integral type via a foam molding method by pouring urethane in the mold.

The baby chair 1 includes a pair of front plates 30 each including a pair of insertion gadgets 31 which may be respectively inserted into the inner space 113 in a penetrating manner from an outer surface of each of a left lower end and a right lower end of the main body 100; a pair of rear plates 40 on an inner surface of the inner space 113 of the main body 100, each including a pair of insertion holes 41 into which the pair of insertion gadgets 31 are inserted by the front plates 30; a pair of binding gadgets 32 each protruding toward the front, that is, an opposite direction of the inserting gadgets 31 from a surface of each of the front plates 30; a pair of belt plates 50 each including a binding hole 51 into which each of the binding gadgets 32 is inserted in a penetrating manner and rotatably attached and belt grooves 52 which may connect an end of a belt 53 to one side of the binding hole 51.

The insertion gadgets 31 on each of the front plate 30 are inserted to pass through the inner space 113 from the outer surface of each of the left lower end and the right lower end of the main body 100. Each of the front plates 30 is attached to the main body 100 by inserting the rear plate 40 into the inner space 113 of the main body 100 through which the insertion gadgets 31 pass so that the insertion gadgets 31 are fixed into the insertion holes 41. The binding hole 51 on each of the belt plates 50 is combined with the binding gadget 32 on each of the front plates 30, and each of the belts 53 is connected to each of the belt plates 50. As the belt plates 50 may rotate with respect to the front plates 30, the belts 53 may rotate by various angles. The belts 53 control movements of the child sitting on the baby chair 10 or enable use of the baby chair 10 by binding the chair 10 to other components.

In this configuration, the belts 53 may be easily attached to the main body 100. As the belts 53 support a lower end thickness of the main body 100 and exert supporting power, working pressure of the belts 53 may be sufficiently sustained. Therefore, it is possible to prevent damages to the main body 100 due to the working pressure of the belts 53 and the detachment of components used to attach the belts 53 to the main body 100. As directions of use of the belts 53 may be adjusted, the belts 53 may be conveniently used.

Thus, it is possible to ensure safety of the child by controlling movements of the child sitting on the main body 100 by using the belts 53, and it is also possible to fasten the main body 100 to other components. Thus, use of the main body 100 may be expanded.

Hereinafter, the above-mentioned configurations will be described in more detail.

Each of the insertion gadgets 31 on the front plate 30 includes a shaft 311 that extends backward from a rear surface of the front plate 30 and a cone 312 formed on an end of each of the shafts 311.

Each of the rear plates 40 includes a pair of conical surfaces 411 extending backward from a rear surface of the rear plate 40 and two insertion holes 41 respectively formed in a rear end of each of the conical surfaces 411. A plurality of incision grooves 412 extending from each of the insertion holes 41 is formed in each of the conical surfaces 411. As an inner end of each of the cones 312 approaches and enters the injection hole 41 including the incision grooves 412, the front plate 30 may be combined with the rear plate 40.

In this way, the front plates 30 and the rear plates 40 may be fixed easily and conveniently in a one-touch method, an inner circumference wall of the main body 100 may be fixed by an overall pressure, and due to a one-time fastening method, will not be separated after fixing.

The binding gadget 32 on each of the front plates 30 includes a circular shaft portion 321 and an oval plate 322 formed on a point of the circular shaft portion 321.

The binding hole 51 in each of the belt plates 50 includes an oval hole 511 into which the oval plate 322 of the front plate 30 is inserted and binding grooves 512 with a narrow entrance and a wide inner space around an outer circumference of the oval hole 511. The circular shaft portion 321 of the front plate 30 may be combined with binding grooves 512 by being inserted in one side of the binding hole 51. One or more binding grooves 512 may be formed in various directions from the outer circumferential surface of each of the oval holes 511.

After the oval plate 322 of each of the front plates 30 is inserted in the oval hole 511 in each of the belt plates 50, each of the circular shaft portions 321 is inserted into the binding grooves 512 at a desired position so that the circular shaft portions 321 may be positioned within the binding grooves 512. Accordingly, each of the belt plates 50 may be rotatably engaged with each of the binding gadgets 32. Locations of the latching grooves 512 may be variously changed as needed. The components may be disassembled in the reverse order of use and combination described above.

In this configuration, the belt plates 50 may be easily combined with or detached from the front plates 30, may be prevented from unintended separation from the front plates 30, and may be variously changed in usage directions and locations.

Figure 5:
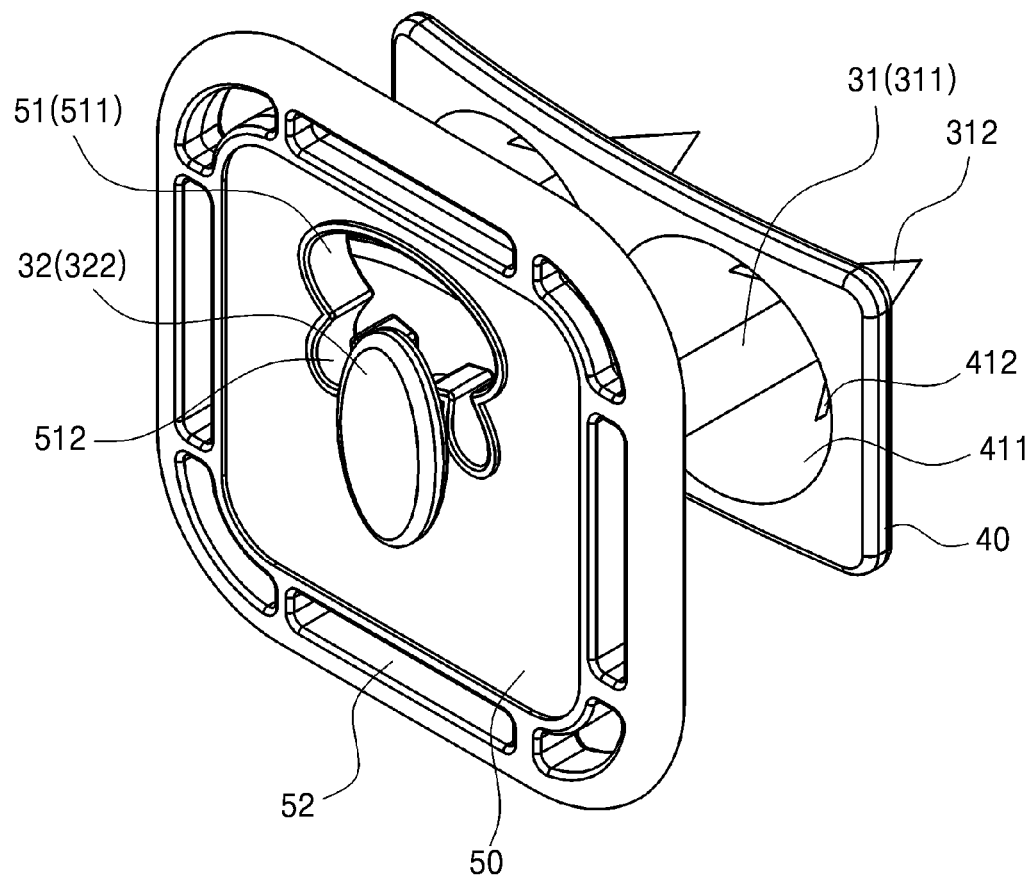
FIG. 5 is a perspective view illustrating a configuration of the belt installation of FIG. 3.
Figure 6:
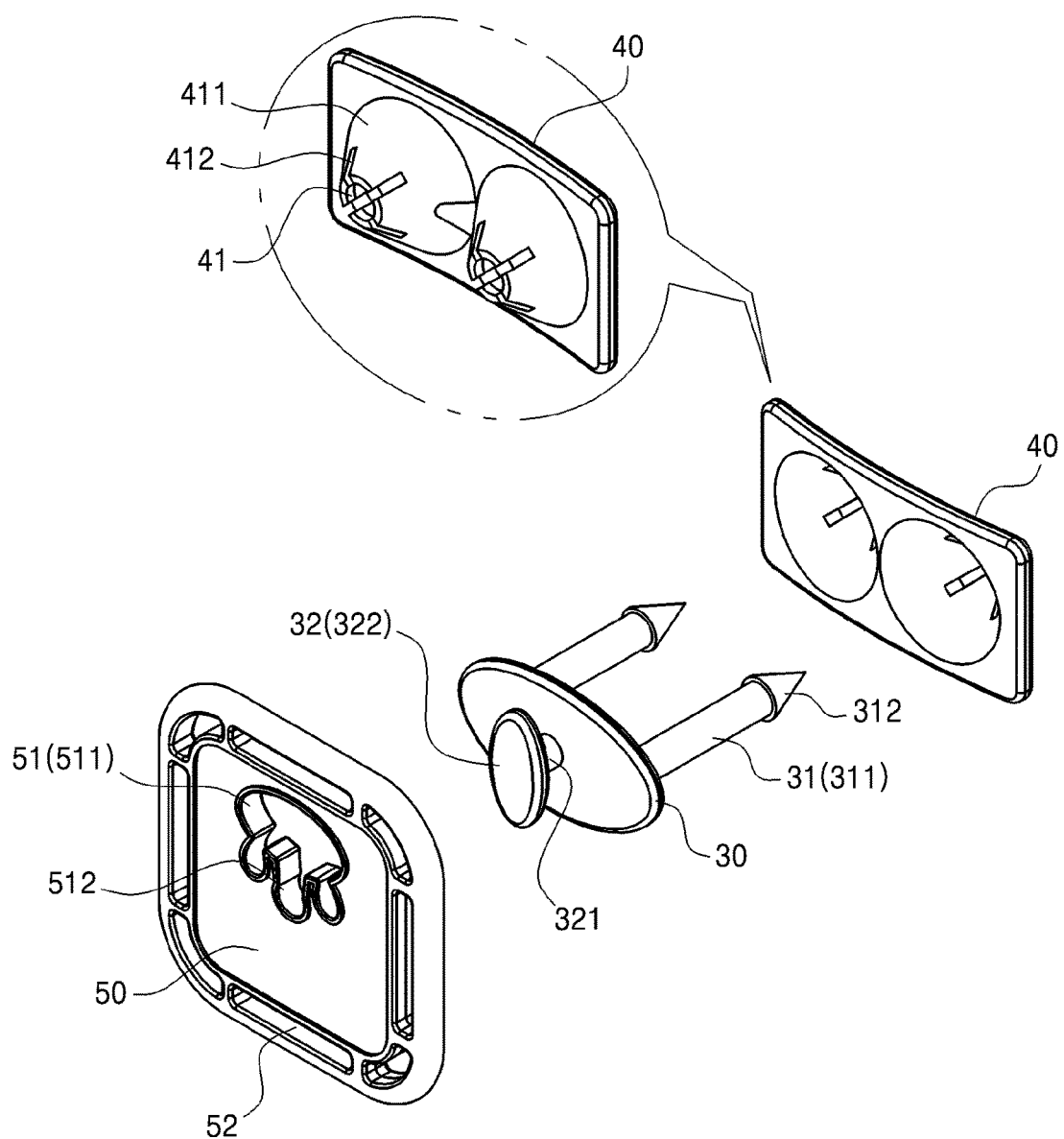
FIG. 6 is an exploded perspective view of FIG. 5.
Figure 7:
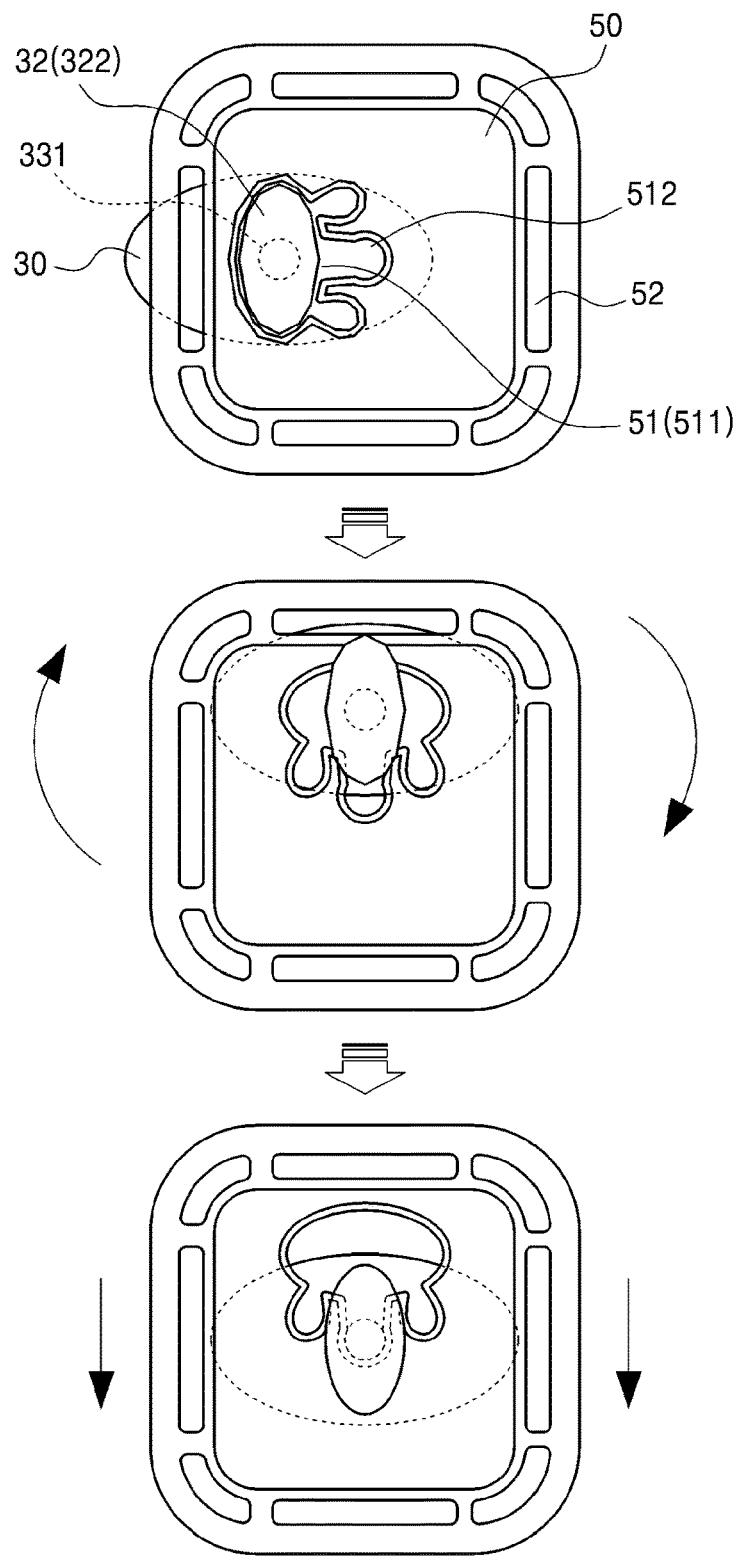
FIG. 7 is an operation chart of a belt plate of FIG. 5.

As illustrated in FIG. 5, one or more belt grooves 52 on each of the belt plates may be formed in various directions from the center of the belt plate 50.

An end of each of the belts 53 may be fixed by making knots or sewing) and attached to desired belt grooves 52 on each of the belt plates 50. One or more than two belts 53 may be fixed to each of the belt plates 50 and used depending on required directions and occasions.

For example, in the case only one belt 53 is attached to each of the belt plates 50, the belts 53 on the left and right may be used to tie the child sitting on the main body 100. When two belts 53 are attached, one may be used like it is described above, and the other may be used to engage the main body 100 to a seat of a dining chair. In the case three belts 53 are attached, two of them may be used like what it is described above, and the other one may fix the main body 100 more firmly by binding the backrest of the dining chair. That is, the number of the belts 53 attached to each of the belt plates 50 may be increased according to binding directions, usage, and needs and the belts 53 may be used in various ways.

Accordingly, the child sitting on the main body 100 may be safely protected, and other components may be attached to the main body 100 in various forms and compatibly used.

Hereinafter, another embodiment of the baby chair 1 of the present disclosure will be described with reference to FIG. 8.

Figure 8:
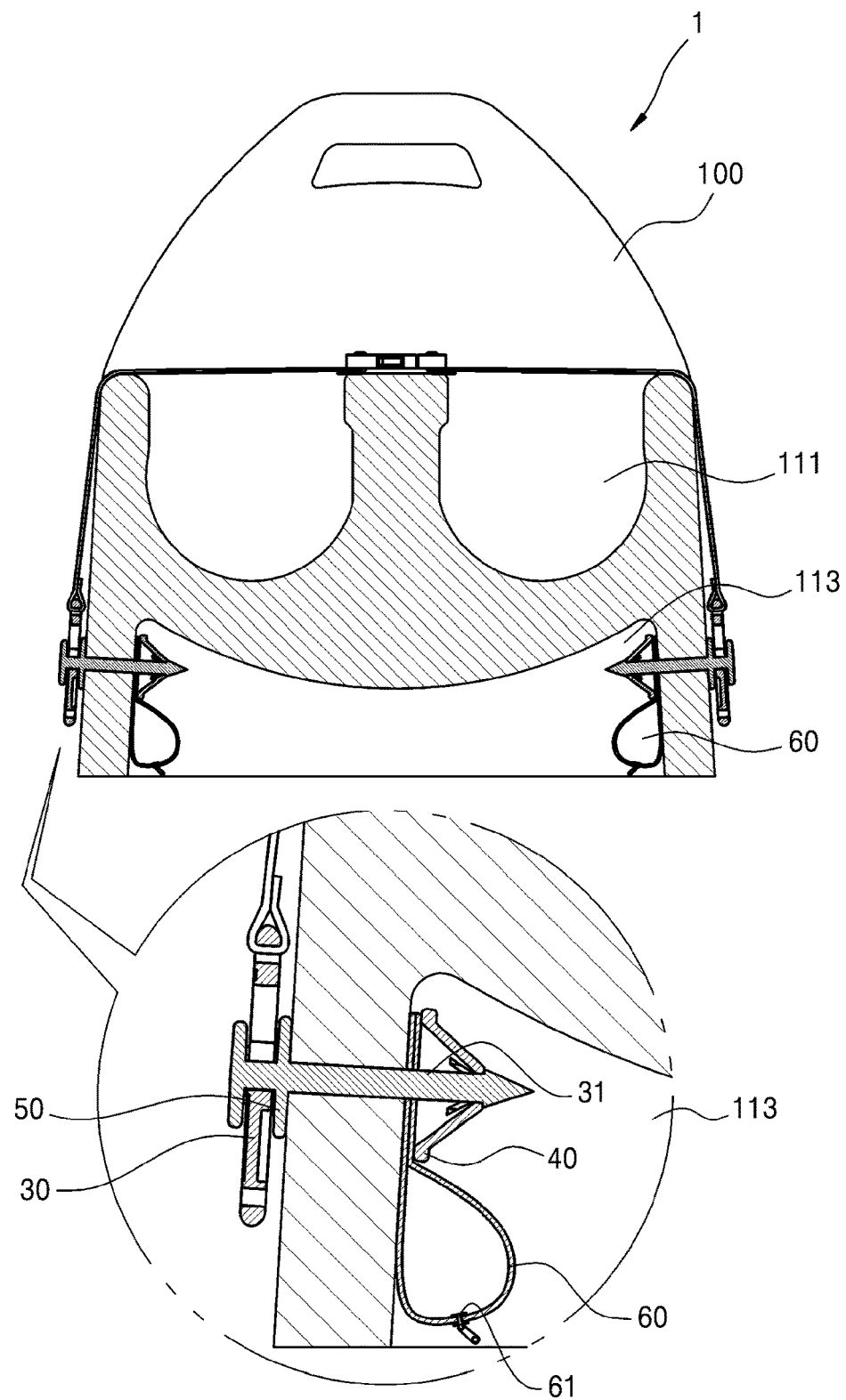
FIG. 8 is a top-plan view of FIG. 3 showing storage pockets.
Figure 9:
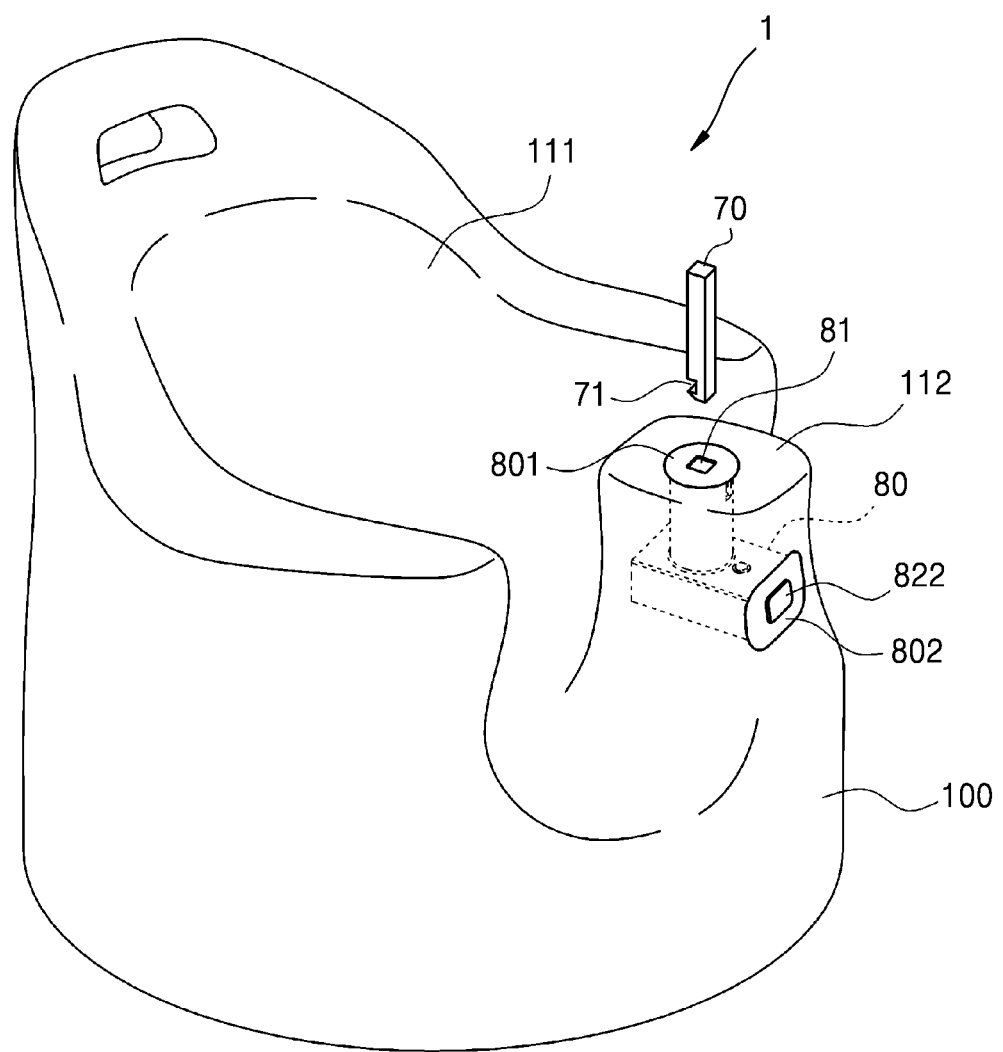
FIG. 9 is a perspective view illustrating a table installation unit according to the present disclosure.
Figure 10:
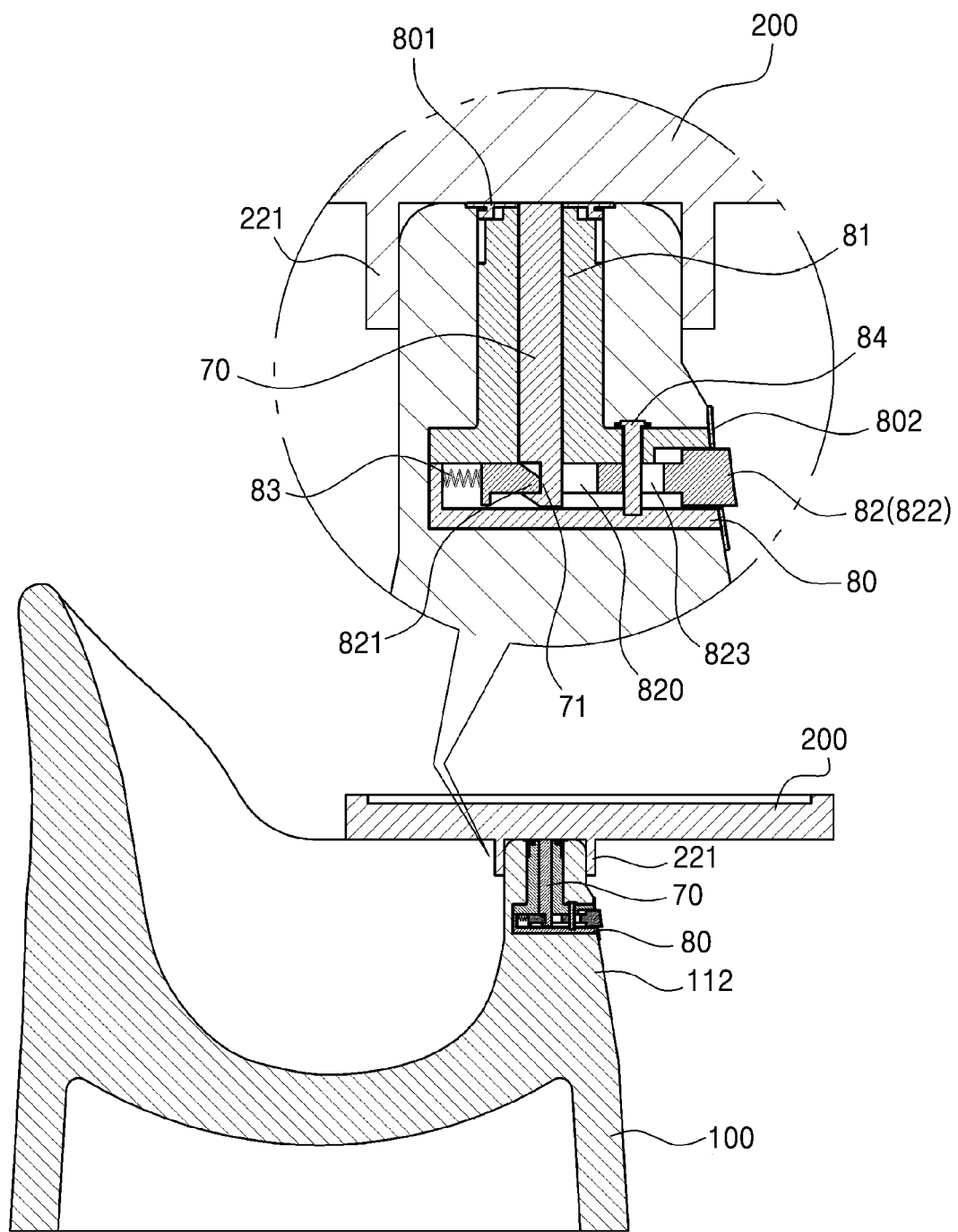
FIG. 10 is a top-plan view of FIG. 9.
Figure 11:
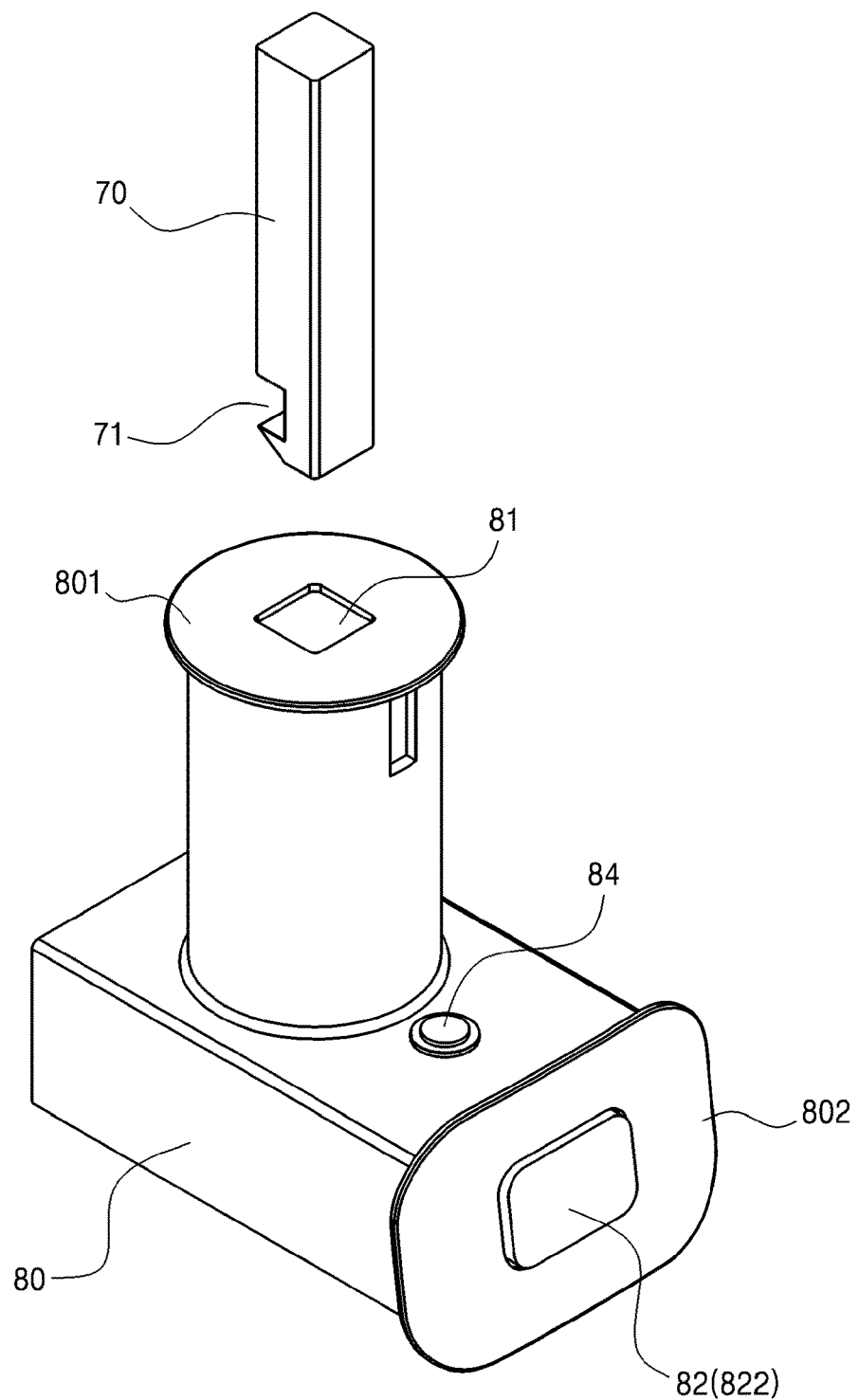
FIG. 11 is a perspective view illustrating the table installation unit of FIG. 9.
Figure 12:
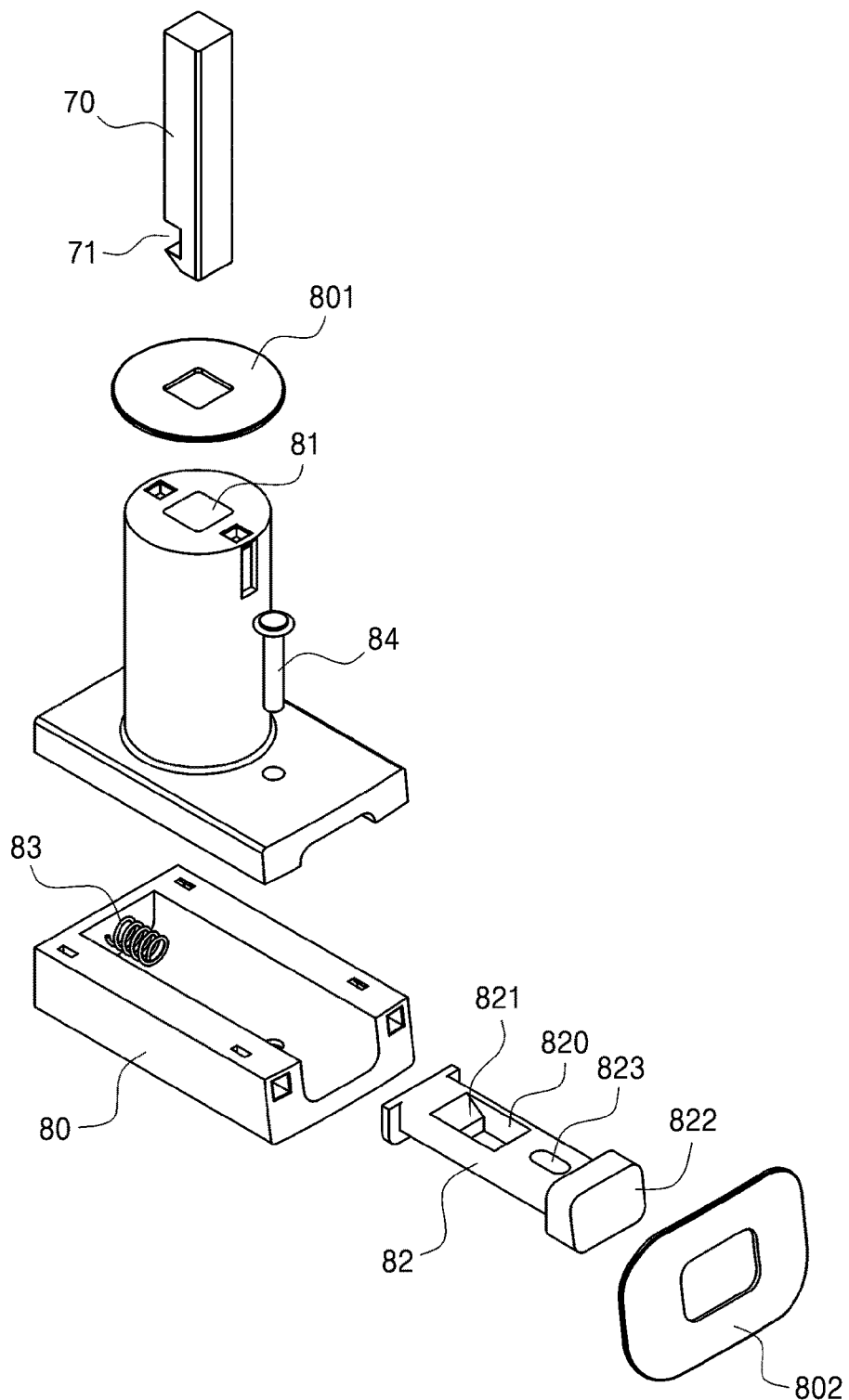
FIG. 12 is an exploded perspective view of FIG. 11.
Figure 13:
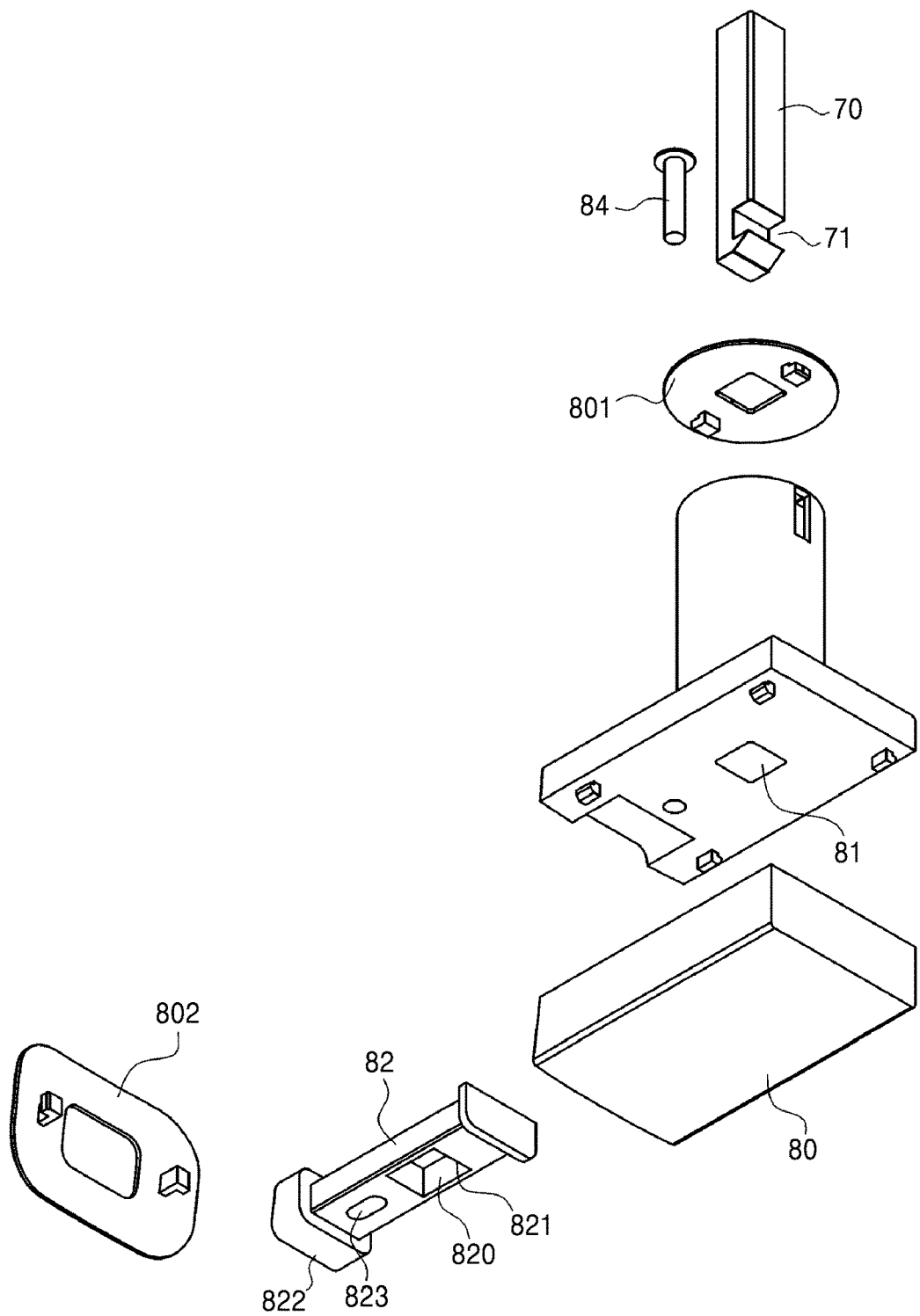
FIG. 13 is an exploded perspective view of FIG. 12 from a different direction.

As illustrated in FIG. 8, the baby chair 1 may include a pair of storage pockets 60, each of which is located on the inner surface of the inner space, is fixed to an end thereof to be positioned between the inner surface and the rear plate, and comprises a zipper on a lower end thereof. The insertion gadgets 31 on each of the front plates 30 may pass through an end of each of the storage packets 60 and be inserted in each of the insertion holes 41.

When the front plates 30 and the rear plates 40 are combined with the main body 100, one end of each of the storage pocket 60 is located on the inner surface of the inner space of the main body 100, and the storage pockets 60 are combined with the main body 100 together with the front plates 30 and the rear plates 40. In this case, the insertion gadgets 31 on each of the front plates 30 may pass through one end of each of the storage pockets 60 and may be coupled to each of the rear plates 40. If the belts 53 are not used, the belt plates 50 and the belts 53 may be separated from the front plates 30 and kept in the storage pockets 60.

Accordingly, if the belts 53 are not used and are kept in the storage pockets 60, there is no need to worry about losing the belts 53 or misplacing them.

Hereinafter, another embodiment of the baby chair 1 of the present disclosure will be described with reference to FIGS. 9 through 13.

As illustrated in FIGS. 9 through 13, the baby chair 1 includes a main body 100 including a sitting groove 11 formed in a shape corresponding to an outer surface of a backside of child sitting on the baby chair 1 and a protrusion pillar 112 protruding upward between the child's legs. The main body 100 may be manufactured in an integral type via foam molding by pouring urethane in a mold. The table 200 includes an insertion surface 221 into which a protrusion pillar 112 of the main body 100 is inserted. Even though not illustrated in the drawings, a latching projection 22 as illustrated in FIG. 1 may be provided on each of a left end and a right end of the table 200. A latch 70 protrudes downward from an inner bottom of the insertion surface 221 of the table 200. A latching groove 71 is formed in an upper part of one side of a lower end of the latch 70. An insertion path 81 into which the latch 70 is inserted is formed on an upper middle floor of the protrusion pillar of the main body 100. A latch fixing module 80 is provided in the protrusion pillar 112. The latch fixing module 80 includes a latching table 82 and a spring 83. The latching table 82 includes a latching jaw 821 engaged with the latching groove 71 of the latch 70 inserted into the insertion path 81. The latching jaw 821 may be formed on one side of the passing hole 820 into which the latching table 82 is inserted so that a lower end of the latch 70 may be engaged with the latching jaw 821. The spring 83 delivers an elastic force to the latching table 82 to move the latching jaw 821 in a direction to be engaged with the latching groove 71. A button 822 is provided on the front of the latching table 82 to press the spring. When the button 822 is pushed on a surface thereof from the front of the projection pillar 112, the latch 70 may be released from the engagement with the latching jaw 821.

The latch fixing module 80 may further include a stopper 84 which passes through the latching table 82 from an outer space and be fixed, and a long hole 823 formed in the latching table 82 to correspond to the stopper 84. By inserting the stopper into the long hole 823, the latching table 82 may be prevented from being separated from the latch fixing module 80. Also, by restricting movements of the latching table 82 by an elastic force, the latching jaw 821 may be engaged with the latching groove 71 of the latch 70.

The latch 70 may be formed integrally or combined with the table 200. Also, after arranging the latch fixing module 80 with the above-mentioned configuration inside a series of cases, the latch fixing module 80 may be inserted into the protrusion pillar 112 by using an insert when manufacturing the main body 100, and may be fixed by using an insert injection molding method to form an integral part with the main body 100. Also, after the injection molding, each of the covers 801 and 802 may be attached respectively on a higher end of the insertion path 81 of the latch fixing module 80 and an outer surface of a button 822, and surfaces of the main body 100 may be cleanly finished.

When the latch 70 of the table 200 is inserted into the insertion path 81 of the latch fixing module 80 attached to the main body 100, a lower end of the latch 70 passes through the latching table 82 at a location where the latching groove 71 of the latch 70 intersects the latching table 82, the latching jaw 821 is engaged with the latching groove 71 due to the elastic force of the spring 83, and therefore, the table is fixed to the main body 100. In this case, the table 200 and the main body 100 may be used together, and when the table 200 is not needed, the latching jaw 821 may move backward by a pressure of the spring 83 generated by pushing the button 822 in the front of the latching jaw 82 of the latching fixing module 80. Thus, an engaging force of the table 200 toward the latch 70 is removed, and the table 200 may be separated from the main body 200.

In this configuration, first, the table 200 may be firmly fixed to the main body 100. Also the table 200 may be easily detached from the main body 100. While the table 200 is attached to or detached from the main body 100, the main body 100 may be protected from being damaged. Components used to fix the table 200 to the main body 100 will not easily fall out of the main body 100. Even when the belts 53 are not used, the table 200 may be firmly fixed to the main body 100 so that the movements of the child may be controlled, and therefore, the safety of the child may be ensured.

This has been described above.

The present disclosure illustrates configurations and components thereof on the basis of the appended drawings in order to help the understanding of the present disclosure. The structures, shapes, arrangements, directions, and numbers of the configurations and components thereof are presented in consideration of the principle of the present disclosure and may be variously changed as needed.

The configurations of the present disclosure and components thereof are just examples to facilitate the understanding of those skilled in the art of the present disclosure and effects thereof. Accordingly, some of the configurations described above may be modified, excluded for cost reduction, convenience of manufacture, environmental condition, or needs, and the present disclosure also may be completed by separating one or some of the configurations and using the same with other configurations at the same time. Also, each the configurations described above may be independently applied to other technical fields in consideration of the principles, usage, functions, roles, actions, effects and so on. Based on the above description, the scope of the present disclosure is covered by the claims of the present disclosure and those skilled in the art may variously modify or change the present disclosure for use.

The present disclosure has been described above and those skilled in the arts may recognize the details of the present disclosure with reference to the detailed descriptions presented above and infer other unexplained details. Thus, those skilled in the art may apply the present disclosure by making various modifications and changes, thereby increasing the scope, application, and efficiency of use.

What is claimed is:

1. A baby chair, comprising:
a main body formed by urethane foam molding and including a sitting groove in a shape corresponding to an outer surface of a backside of a child sitting in the chair and an inner space in a lower end thereof;
a pair of front plates, each including a pair of insertion gadgets respectively inserted into the inner space from an outer surface of each of a left lower end and a right lower end of the main body;
a pair of rear plates on an inner surface of the inner space of the main body, each including a pair of insertion holes into which the pair of insertion gadgets is inserted;
a pair of binding gadgets, each protruding toward an opposite direction of each pair of the insertion gadgets from each of the front plates; and
a pair of belt plates, each comprising a binding hole into which the pair of binding gadgets is inserted in a penetrating manner and rotatably attached thereto and belt grooves which connect one side of the binding hole to an end of each of belts.

2. The baby chair according to claim 1, wherein
each of the inserting gadgets includes a shaft extending from a rear surface of each of the front plates and a cone on an end of the shaft,
each of the rear plates includes a pair of conical surfaces extending backward from a rear surface of each of the rear plates and having the pair of insertion holes in rear ends;
a plurality of incision grooves are formed from each of the insertion holes along outer circumferences of the pair of conical surfaces,
inner ends of the cones are flexibly inserted into the insertion holes and the front plates are combined with the rear plates.

3. The baby chair according to claim 2, wherein
each of the binding gadgets includes a circular shaft portion protruding from a surface on each of the front plates and an oval plate formed on a point of the circular shaft portion,
each of the binding holes includes an oval hole into which the oval plate is inserted and binding grooves formed along an outer circumference of the oval hole, each of the binding grooves having a narrow entrance and a wide inner space so that the circular shaft portion may be inserted into one side thereof and engaged with the binding groove.

4. The baby chair according to claim 3, wherein
a large number of the binding grooves are formed in various directions from an outer circumferential surface of each of the oval holes.

5. The baby chair according to claim 1, wherein
a large number of the belt grooves are formed in various directions from a center of each of the belt plates.

6. The baby chair according to claim 1, further comprising:
a pair of storage pockets, each of which is located on the inner surface of the inner space, is fixed by an end thereof to be positioned between the inner surface and the rear plate and includes a zipper at a lower end thereof; and,
each pair of the insertion gadgets passes through each of the storage pocket and is inserted into each pair of the insertion holes.

* * * * *